(12) United States Patent
Drecq (10) Patent No.: US 6,474,275 B1
(45) Date of Patent: Nov. 5, 2002

(54) TWO-STROKE INTERNAL COMBUSTION ENGINE PROVIDED WITH A SUPERCHARGING DEVICE AND EXHAUST GAS PARTIAL RECYCLING

(76) Inventor: Daniel Drecq, 8, rue Octave Allaire, 78610 Saint Leger en Yvelines (FR)

( * ) Notice: Subject to any disclaimer, the term of this patent is extended or adjusted under 35 U.S.C. 154(b) by 0 days.

(21) Appl. No.: 09/720,417

(22) PCT Filed: Jun. 8, 1999

(86) PCT No.: PCT/FR99/01341

§ 371 (c)(1),
(2), (4) Date: Dec. 22, 2000

(87) PCT Pub. No.: WO99/67516

PCT Pub. Date: Dec. 29, 1999

(30) Foreign Application Priority Data

Jun. 22, 1998 (FR) .............................. 98 07835

(51) Int. Cl.[7] .................................. F02B 47/08
(52) U.S. Cl. ................. 123/65 V; 123/65 VA
(58) Field of Search ........................ 123/65 BA, 65 VC, 123/65 V (56) References Cited

U.S. PATENT DOCUMENTS

| | | | | |
|---|---|---|---|---|
| 4,016,839 A | * | 4/1977 | Morton | 123/65 BA |
| 4,864,979 A | * | 9/1989 | Eickmann | 123/65 BA |
| 4,995,354 A | * | 2/1991 | Morikawa | 123/65 V |
| 5,072,699 A | * | 12/1991 | Pien | 123/65 VC |
| 5,133,309 A | * | 7/1992 | Ishii | 123/65 V |
| 5,337,707 A | * | 8/1994 | Blundell et al. | 123/65 V |
| 5,586,525 A | * | 12/1996 | Masse | 123/65 V |
| 5,657,630 A | | 8/1997 | Kjemtrup et al. | |
| 5,746,163 A | | 5/1998 | Green | |
| 5,819,693 A | * | 10/1998 | Curtil | 123/65 BA |
| 5,870,982 A | * | 2/1999 | Strawz | 123/65 V |

FOREIGN PATENT DOCUMENTS

| | | |
|---|---|---|
| FR | 2080086 | 11/1971 |
| JP | 01285651 | 11/1989 |
| JP | 06800832 | 7/1994 |
| JP | 06257520 | 9/1994 |
| WO | WO 99/13205 | 3/1999 |

* cited by examiner

Primary Examiner—Paul J. Hirsch
(74) Attorney, Agent, or Firm—Young & Thompson

(57) ABSTRACT

The invention concerns a two-stroke engine comprising a cylinder (1) wherein moves a piston (2), exhaust (6) and intake (7) devices and a blower (9) for blowing in the cylinder (1) a scavenging air stream , wherein an additional volume (10) communicates with the cylinder (1) through closing and opening means (11, 12) whereof the movements are controlled synchdnously or out shift with those of the piston (2) in the cylinder (1) such that, during the combustion/expansion phase the burnt gases compress the air located in the additional volume (10) by penetrating therein at least partially, the air/burnt gas mixture is trapped therein under pressure; then the mixture is induced into the cylinder (1) during the intake phase.

15 Claims, 9 Drawing Sheets

TWO-STROKE INTERNAL COMBUSTION ENGINE PROVIDED WITH A SUPERCHARGING DEVICE AND EXHAUST GAS PARTIAL RECYCLING

BACKGROUND OF THE INVENTION

Patent application No. 97/11 294 of Sep. 11, 1997 described an internal combustion engine comprising at least one exhaust manifold branch connecting at least two cylinders, this exhaust manifold branch comprising a controlled valve and being connected to the exhaust gas outlet tract via a rotary spool.

This arrangement can work with any kind of combustion engine whether it be a two-stroke or a four-stroke engine.

SUMMARY OF THE INVENTION

The present invention relates to a simpler and therefore less expensive device intended for a two-stroke engine of the uniflow type.

It relates to a two-stroke engine of the type comprising a cylinder, a piston, exhaust valves, inlet ports and a blower for sending a stream of scavenging air into the cylinder, characterized in that it comprises an additional volume communicating with the cylinder via closure and opening means, these means being controlled so that they are synchronous with or can be phase-shifted with respect to the movements of the piston in the cylinder so that, during the combustion/expansion phase, burnt gases compress the air located in said additional volume by at least partially entering it; that this air/burnt gases mixture is trapped under pressure therein; then that this mixture is let into the cylinder during the inlet phase; and that finally, fresh air from the blower is introduced into said additional volume.

BRIEF DESCRIPTION OF THE DRAWING

By way of non-limiting examples, and to make the invention easier to understand, the appended drawings depict.

In all these figures, the same elements bear the same references.

DETAILED DESCRIPTION OF THE PREFERRED EMBODIMENTS

The internal combustion engine depicted is a two-stroke engine which has a cylinder 1 in which there moves a piston 2 coupled by a connecting rod 3 to the wrist pin 4 of a crankshaft 5. The cylinder 1 is equipped at its upper part with one or more exhaust valves 6. Inlet is via a number of ports 7 made in the base of the cylinder 1, supplied by a ring 8 itself connected to a blower 9.

An additional volume 10, which may have any appropriate shape, communicates with the top and bottom of the cylinder 1, via two rotary shutters 11, 12 and/or 21.

The rotary shutter 11 is, for example, a two-way rotary spool connected to the pipes 13, 14, 15 and 16. The pipe 13 comes from the cylinder 1 downstream of the exhaust valve(s) 6; the pipe 14 leads to the additional volume 10; the pipes 15 and 16 lead to the exhaust manifold, not depicted.

The rotary shutter 12 is, for example, a multiway rotary spool connected to the pipes 17, 18 and 19. The pipe 17 leads to the volume 10; the pipe 18 leads to the inlet ring 8; the pipe 19 leads into the cylinder 1 near its bottom.

Figure 4A:
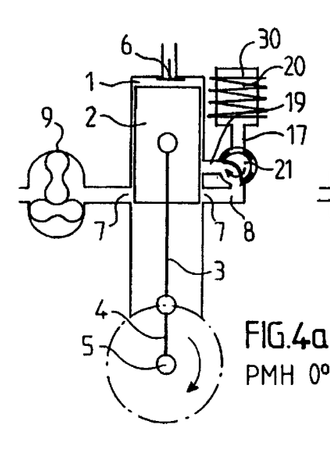
FIG. 4 (4a–4h) : a diagrammatic view of a fourth embodiment of the invention, the parts being depicted in eight successive positions.
Figure 4B:
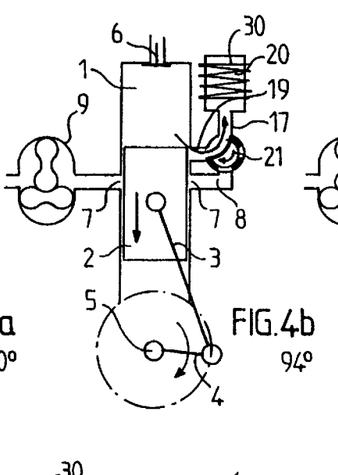
Figure 4C:
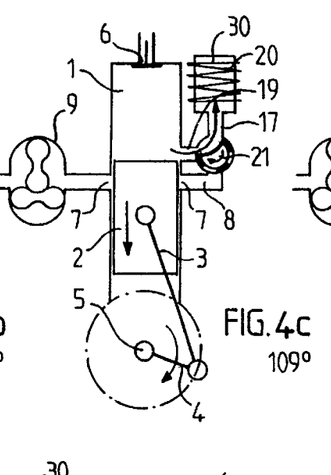
Figure 4D:
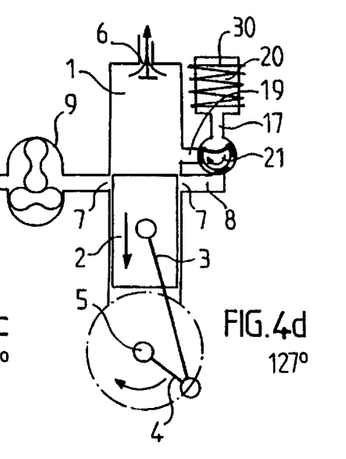
Figure 4E:
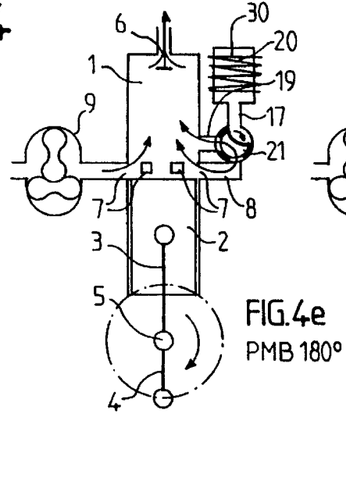
Figure 4F:
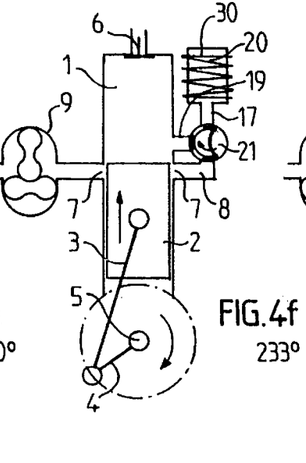
Figure 4G:
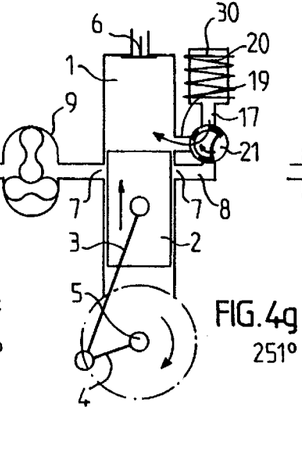
Figure 4H:
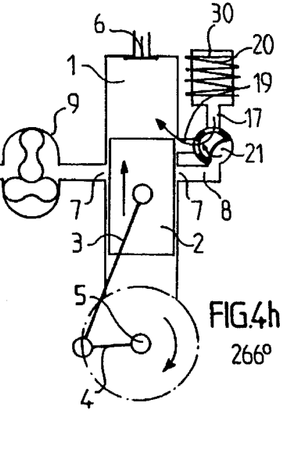
Figure 5:
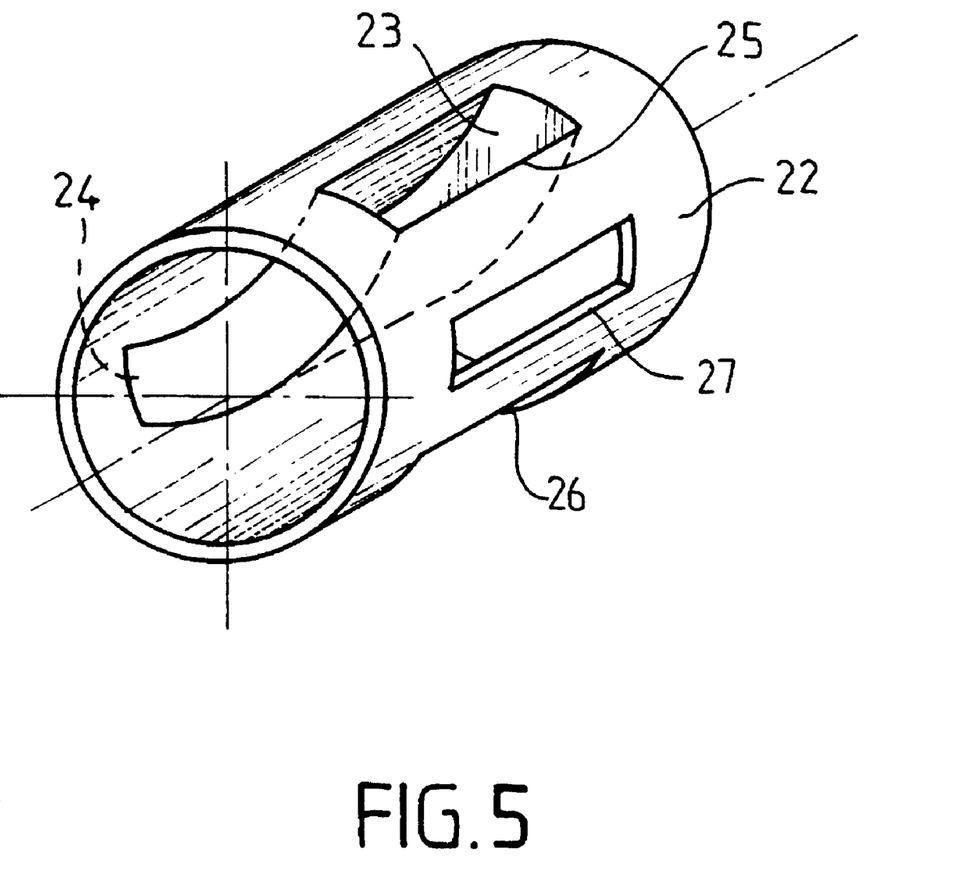
FIG. 5: a perspective view on a larger scale of one embodiment of the closure means of the embodiment of FIG. 3.

The rotary shutter 21 is depicted in detail in FIG. 5: it consists of a hollow spool 22 with four ports 23, 24, 26 and 27, two of these openings 23 and 24 being connected to one another by a duct 25 arranged inside the spool 22 so that this shutter 21 allows the communication either of the openings 23 and 24 via the duct 25 or the openings 26 and 27 via the spool 22. When a rotary shutter 21 such as this is used (FIGS. 3 and 4), the volume of the spool 22 adds to the volume of the pipe 19 to define the amount of fresh air stored.

The rotary movements of the rotary shutters 11, 12 and 21 are linked in any appropriate way, known to those skilled in the art and therefore not described, to the rotary movement of the crankshaft 5, in a 1:1 ratio or some ratio other than 1:1 which may be in phase with or phase-shifted with respect to the movement of the crankshaft 5.

The way in which the device works is described hereinafter in relation to FIGS. 1a to 1g.

Figure 1A:
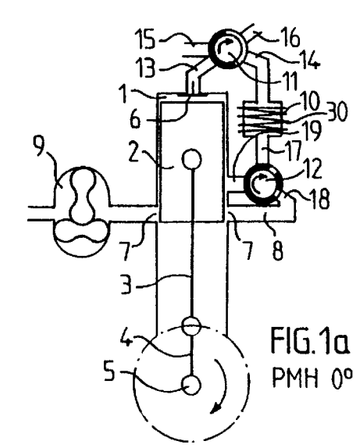
FIG. 1 (1a–1g) : a diagrammatic view of a first embodiment of the invention, the parts being depicted in seven successive positions.
Figure 1B:
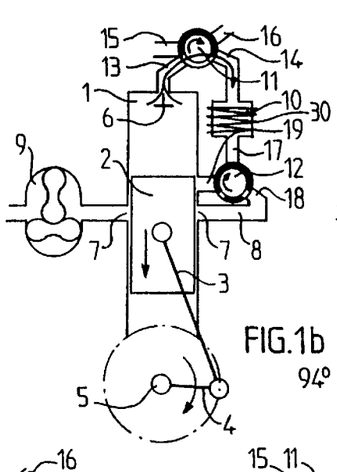
Figure 1C:
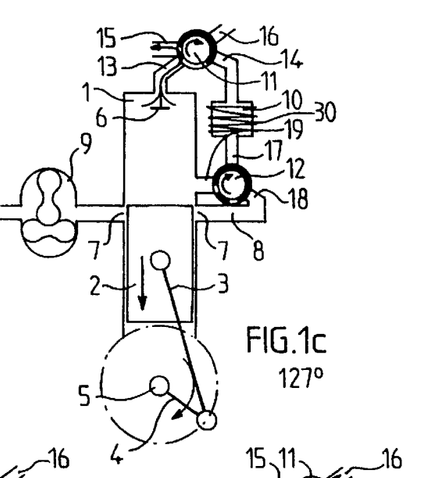
Figure 1D:
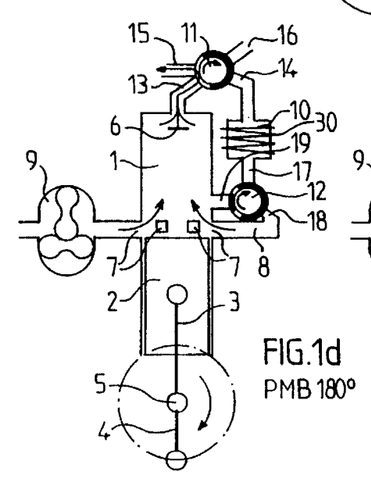
Figure 1E:
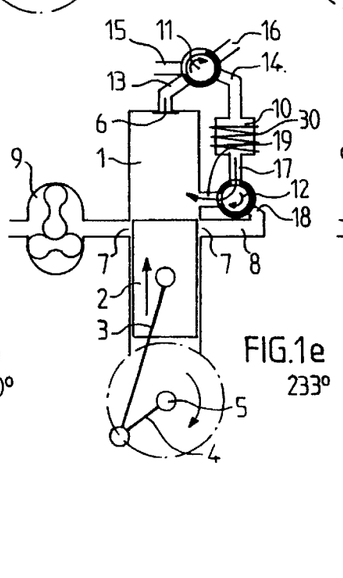
Figure 1F:
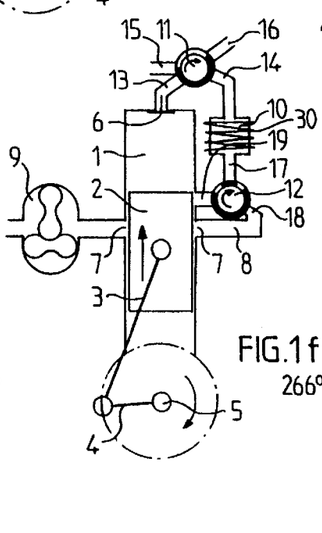
Figure 1G:
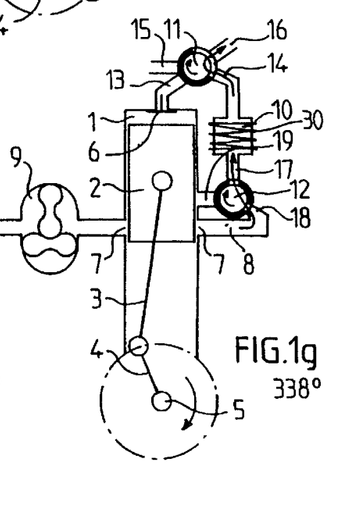

In FIG. 1a, the cylinder 1 is at its top dead center (TDC) considered as being the starting position at 0°; in FIG. 1b, the cylinder 1 has begun its downstroke corresponding to the expansion phase, the wrist pin 4 having described an angle of 94° for example; in FIG. 1c, the cylinder continues its downward movement, the wrist pin 4 having described an angle of 127°; in FIG. 1d, the cylinder 1 is at its bottom dead center (BDC), at the end of the inlet phase, the ports 7 having been uncovered and the cylinder 1 filled with air by the blower 9, the wrist pin 4 having described an angle of 180°; in FIG. 1e, the cylinder 1 has begun its compression stroke, the ports 7 being blocked off, the wrist pin 4 having described an angle of 233°; in FIG. 1f, the cylinder 1 continues its upward compression stroke, the wrist pin 4 having described an angle of 266°; in FIG. 1g, the cylinder 1 approaches its TDC, the wrist pin 4 having described an angle of 338°.

In FIG. 1a, the valve or valves 6 are closed as are the shutters 11 and 12.

In FIG. 1b, the valve or valves 6 open and the shutter 11, which has pivoted, for example in the same direction as the crankshaft 5, causes the pipes 13 and 14 to communicate. The shutter 12 has also rotated by the same amount and in the same direction but this had not led to any communication between the pipes: the pipe 17 leading from the volume 10 is closed. What this means is that a blast of burnt gases under pressure is discharged into said pipes 13 and 14, which compresses the air in the volume 10 while at the same time introducing a portion of burnt gases thereinto, this portion corresponding to the angular transfer period.

In FIG. 1c, the valve or valves 6 are still open; the shutter 11 having rotated has placed the pipes 13 and 15 in communication while closing the pipe 14; the shutter 12 has also rotated but without causing any communication. What this means is that the air/burnt gases mixture previously introduced under pressure (about 3.5 bar at full load) into the volume 10 is trapped therein and that the burnt gases escape via the pipe 15 to the exhaust manifold.

In FIG. 1d, the exhaust valve or valves 6 are still open; the shutter 11, although it has continued to rotate, maintains the communication between the pipes 13 and 15; the shutter 12 has also rotated but without causing any communication; the ports 7 are uncovered. What this means is that air from the blower 9 performs scavenging which discharges the burnt gases through the pipe 15, the cylinder 1 fills with air at the fairly low pressure of the blower (about 1.2 bar) and the air/burnt gases mixture is still trapped under pressure (about 3.5 bar) in the volume 10.

In FIG. 1e, the valve or valves 6 are closed; the shutter 11 has continued to rotate, the pipes 13 and 15 are still in communication but this has no effect because the valve is closed; the cylinder 1 has covered over the openings 7; but the shutter 12 has placed the pipes 17 and 19 in communication. What this means is that the air and/or burnt gases mixture, which was trapped under pressure in the volume 10, escapes and, under pressure, fills the cylinder 1. This achieves both the supercharging of the cylinder and/or partial recirculation of burnt gases, an operation known by the name of EGR (for Exhaust Gas Recirculation), and which has the effect of reducing nitrous oxides emissions at low speed.

In FIG. 1f, the valve or valves 6 are closed as are the shutters 11 and 12 which means that the compression phase continues.

In FIG. 1g, the valve or valves 6 are closed; the shutter 11 has placed the pipes 14 and 16 in communication; the shutter 12 has placed the pipes 17 and 18 in communication. What this means is that the fresh air, driven by the blower 9 into the inlet ring 8, takes the pipes 18 then 17 to enter the volume 10 and that the residual air and/or burnt gases mixture in said volume 10 is discharged through the pipes 14 then 16.

When the piston reaches TDC, the cycle is ready to begin again.

FIGS. 2 to 4 depict three alternative forms of embodiment in which elements the same as those of FIG. 1 carry the same references.

The only difference between the devices of FIGS. 2 and 3 stems from the fact that the rotary shutters 11, 12 and 21 produce different communications which means that the circulations are not the same.

What changes is that in the case of FIGS. 2 and 3, the volume 10 is filled and emptied via its bottom through the shutter 12 or 21 whereas in the previous example it was filled from the top, through the shutter 11 and emptied via its bottom through the shutter 12.

Figures 2A, 2B, 2C, 2D, 2E, 2F, 2G, 2H:
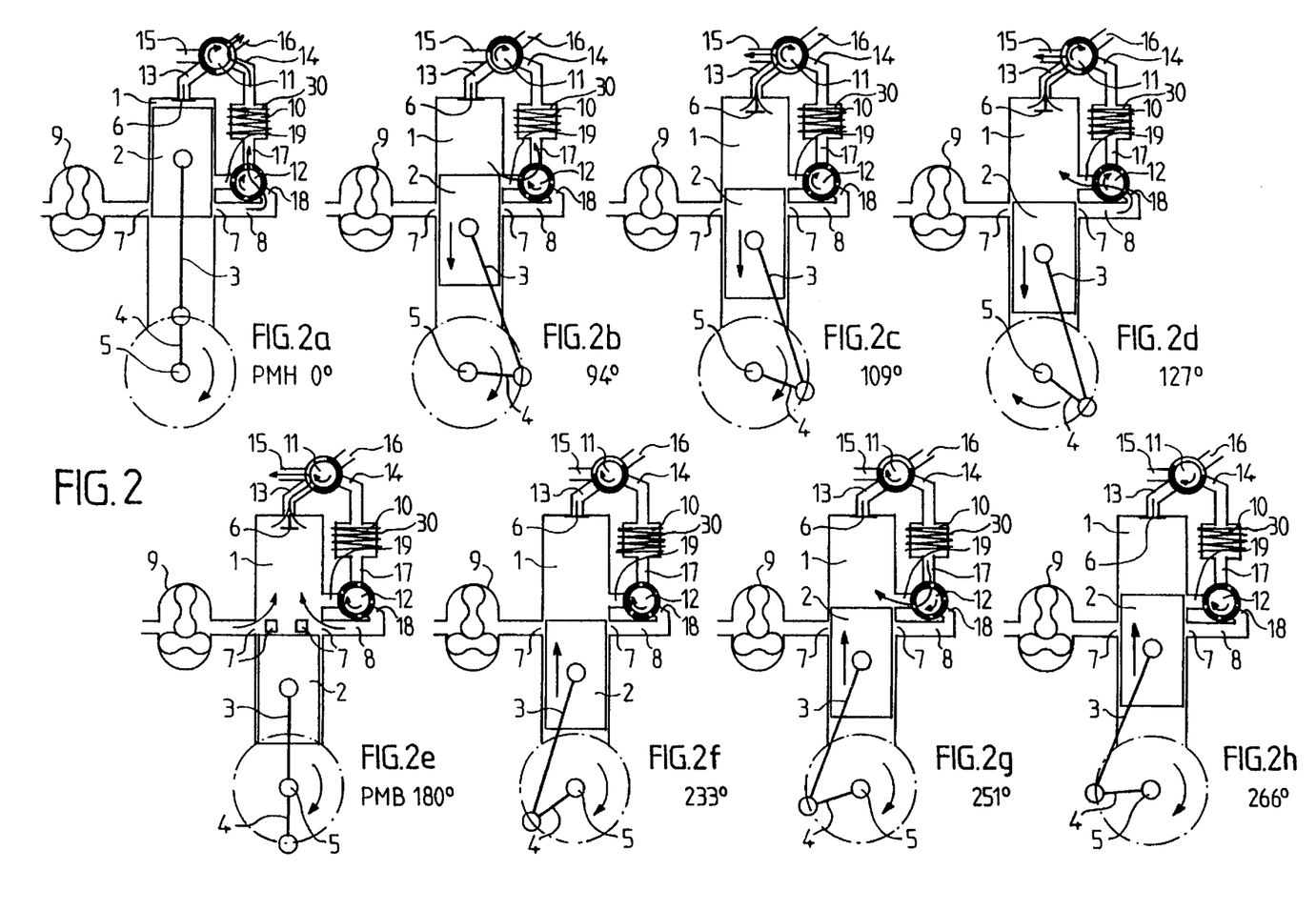
FIG. 2 (2a–2h): a diagrammatic view of a second embodiment of the invention, the parts being depicted in eight successive positions.

In FIG. 2a, with the piston 2 at its TDC, the rotary shutter 12 causes the pipes 17 and 18 to communicate, while the rotary shutter 11 causes the pipes 14 and 16 to communicate. What this means is that the volume 10 is scavenged with fresh air from the blower 9 which passes through the ring 8, the pipe 18, then the pipe 17, any residual air and/or burnt gases mixture in the volume 10 being discharged through the pipes 14 and 16.

It can be seen in FIG. 2b, where the wrist pin 4 has described an angle of 94° (which corresponds to FIG. 1b), that the valve or valves 6 are not yet open but that the piston 2 is uncovering the opening of the pipe 19. The combusting gases under pressure in the cylinder 1 therefore escape down the pipe 19, through the shutter 12 to the pipe 17 as far as the volume 10. As the pipe 14 is closed, the burnt gases compress the air in the volume 10 and partially enter it.

In FIG. 2c, in which the wrist pin 4 has described an angle of 109°, the shutter 12 has rotated so that it closes the pipe 17 (and the pipe 19). The pressurized air and/or burnt gases mixture in the volume 10 is thus trapped therein. The valve or valves 6 can then open to allow exhaust, the shutter 11 having placed the pipes 13 and 15 in communication.

In FIG. 2d, in which the wrist pin 4 has described an angle of 127° (which corresponds to FIG. 1c), the shutter 11 is still providing communication between the pipes 13 and 15, while the shutter 12 establishes communication between the pipes 18 and 19. What this means is that fresh air, driven by the blower 9, passes through the pipe 18, passes through the shutter 12, arrives in the cylinder 1 via the pipe 19 and begins to scavenge said cylinder, the burnt gases being driven through the valve 6.

In FIG. 2e, which corresponds to FIG. 1d, the wrist pin 4 has described an angle of 180° and the cylinder 1 is at its BDC. Scavenging continues and the cylinder is filled with fresh air at the low pressure delivered by the blower (about 1.2 bar).

In FIG. 2f, which corresponds to FIG. 1c, the wrist pin 4 has described an angle of 233°, and the compression phase begins; however, the air and/or burnt gases mixture trapped in the volume 10 has not yet been introduced into the cylinder, as it had been previously.

In FIG. 2g, the wrist pin 4 has described an angle of 251°. In this position, the shutter 12 establishes the communication between the pipes 17 and 19. What this means is that the air and/or burnt gases mixture trapped in the volume 10 can escape down the pipe 17, pass through the shutter 12, and enter the cylinder 1 via the pipe 19. This simultaneously produces supercharging in the cylinder 1 and partial recirculation of the burnt gases, which operation was performed in FIG. 1e in the previous example.

An operation similar to the operation described in relation to FIG. 1 is thus obtained.

In FIGS. 1 and 2, the spool 12 is equipped only with ports. It is found that, in the case of FIG. 2, with such a spool, it is not possible to exceed about 15° crank angle to use the exhaust blast, then to use the same time to recover the air stored in the duct or volume 10: this time may not be long enough for the system to be effective.

It is therefore preferable to use a shutter like the one described in FIG. 5, that is to say a shutter 21 equipped with a hollow rotary spool 22.

This arrangement is described in relation to FIG. 3. In that figure, the rotary shutter 11 is a two-way shutter, whereas the ported shutter 12 of FIG. 2 is replaced by a rotary shutter 21, which is the one depicted in FIG. 5.

Figures 3A, 3B, 3C, 3D, 3E, 3F, 3G, 3H:
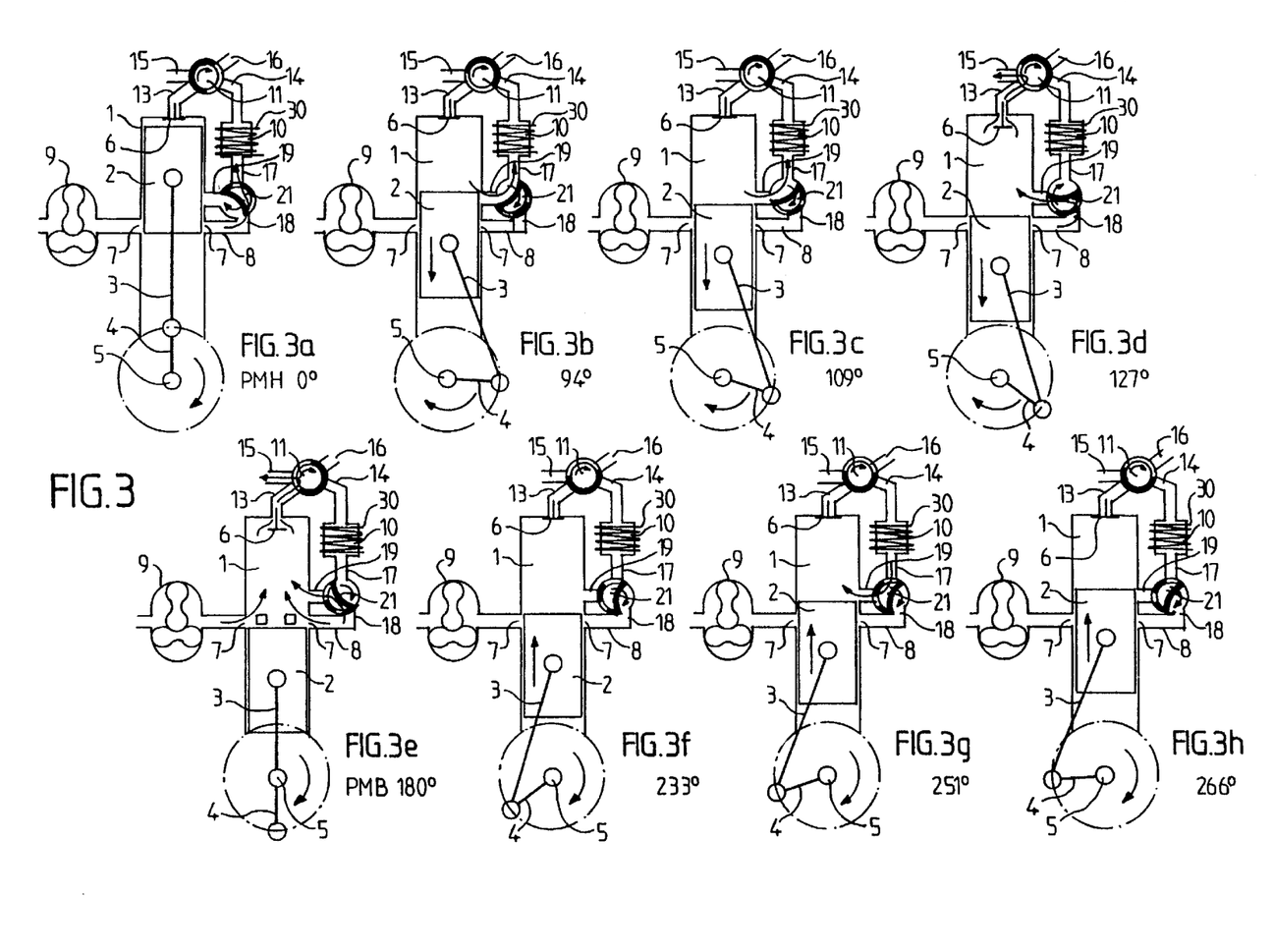
FIG. 3 (3a–3h) : a diagrammatic view of a third embodiment of the invention, the parts being depicted in eight successive positions.

Like FIGS. 1 and 2, FIG. 3 is broken down into eight FIGS. 3a to 3h illustrating eight positions occupied by the moving parts in the course of one cycle.

Position 3a corresponds to the combustion phase, all the openings of the cylinder 1 being closed and the piston 2 being at its top dead center. In this position, the upper rotary shutter 11 causes the pipes 14 and 16 to communicate while the lower rotary shutter 21 causes the pipes 18 and 17 to communicate via the hollow spool 22 of said shutter 21. What this means is that air from the blower 9 enters the ring 8, then the pipe 18, passes through the shutter 21, takes the pipe 17, passes through the volume 10 and exits via the pipe 14, the shutter 11 and the pipe 16. The volume 10 is thus scavenged and filled with fresh air.

In position 3b, the crankshaft 5 has rotated through 94°. The expansion phase is in progress, the piston 2 has sunk in the cylinder 1 and begun to uncover the orifice via which the pipe 19 opens into the cylinder 1. The upper shutter 11 has closed the pipe 14 while the lower shutter 21 has placed the pipes 17 and 19 in communication: it then follows that a blast of pressurized burnt gases begins to enter the volume 10.

In position 3c, the expansion movement continues and the blast of combustion gases continues under pressure to enter the volume 10.

In position 3d, the lower shutter 21 closes any communication between the pipe 17 and the pipes 18 or 19 so that the air in the volume 10 and the burnt gases which have entered this volume are trapped under pressure in said volume 10.

However, the internal architecture of said spool 21 means that it places the pipes 18 and 19 in communication. At the same time, the upper shutter 11 has placed the pipes 13 and 15 in connection. Because, in this position 3d, the valve or valves 6 are open, the cylinder 1 is scavenged with fresh air from the blower 9, the burnt gases being discharged through the pipe 15 to the exhaust manifold.

In position 3e, this scavenging continues.

In position 3f, the piston 1 has moved past its bottom dead center and has begun the compression phase, the two shutters 11 and 21 being in a closed position, as is or are the valve or valves 6.

In position 3g, the valve or valves 6 are closed, the shutter 11 is closed, but the shutter 21 opens the communication between the pipes 17 and 19, that is to say between the volume 10 and the cylinder 1. The air and/or gas mixture which was trapped in the volume 10 can then escape and enter the cylinder 1.

In position 3h, the two shutters 11 and 21 are closed and the compression phase continues to TDC.

FIG. 4 illustrates another embodiment of the invention. In this figure, elements identical to those of FIGS. 1, 2 and 3 carry the same references. FIGS. 4a to 4h correspond to the same positions of the wrist pin 4 as FIGS. 2a to 2h and 3a to 3h.

In this exemplary embodiment, there is now just one rotary shutter 21 communicating with an additional volume 20, which is a closed volume, this rotary shutter 21 being a three-way shutter.

In FIG. 4a, the combustion/expansion stroke is beginning.

In FIG. 4b, the wrist pin 4 has described an angle of 94°, the piston 2 is therefore uncovering the orifice via which the pipe 19 opens into the cylinder 1. In this position, the rotary shutter 21 establishes communication between the pipes 19 and 17 so that a blast of pressurized burnt gases discharges into the volume 20 the air from the pipe 19 and/or the gases.

The same is true of FIG. 4c.

In FIG. 4d, the wrist pin 4 having rotated through 127°, the rotary shutter 21 has interrupted any communication between the pipe 17 and the other pipes 18 and 19, which means that the pressurized air and/or burnt gases mixture is trapped in the volume 20. The valve or valves 6 open.

In FIG. 4e, the valve or valves 6 are open, the openings 7 are no longer closed off by the piston 2. Air which will later be used for supercharging is in the pipe 19 and in the hollow spool 22 of the rotary shutter: the respective dimensions of said spool 22 and of the pipe 19 can therefore be determined at will to store the desired volume of air. The air blown by the blower 9 scavenges the cylinder, which discharges the burnt gases through the valve or valves 6 and fills the cylinder with fresh air.

In FIG. 4f, the position of the rotary shutter 21 is such that the fresh air from the blower 9, which was previously introduced into the hollow spool of said shutter, is trapped therein.

In FIG. 4g, the position of the rotary shutter 21 is such that the pipe 17 communicates with the pipe 19. What this means is that the pressurized mixture, trapped in the volume 20, post-fills the cylinder 1 by discharging the fresh air which was previously trapped in the spool of the rotary shutter 21 together with the fresh air contained in the pipe 19.

In FIG. 4h, the opening via which the pipe 19 communicates with the cylinder 1 is closed off.

Thus, fresh-air supercharging and/or introduction of burnt gases are obtained simultaneously.

FIG. 5 depicts the rotary spool 22 of the rotary shutter 21. It has four openings 23, 24, 26 and 27, two of these openings 23 and 24 being connected by a duct 25 so that the two pipes 23 and 24 can communicate only with one another and never with the other two.

Note that, as depicted, it is possible to use any appropriate means 30 to cool the volume 10 or 20, which makes it possible to increase the density of the air and/or gases mixture trapped in said additional volume and improves the output of the engine.

FIGS. 6 to 9 are diagrams which correspond to FIGS. 1 to 4 respectfully.

Figure 6:
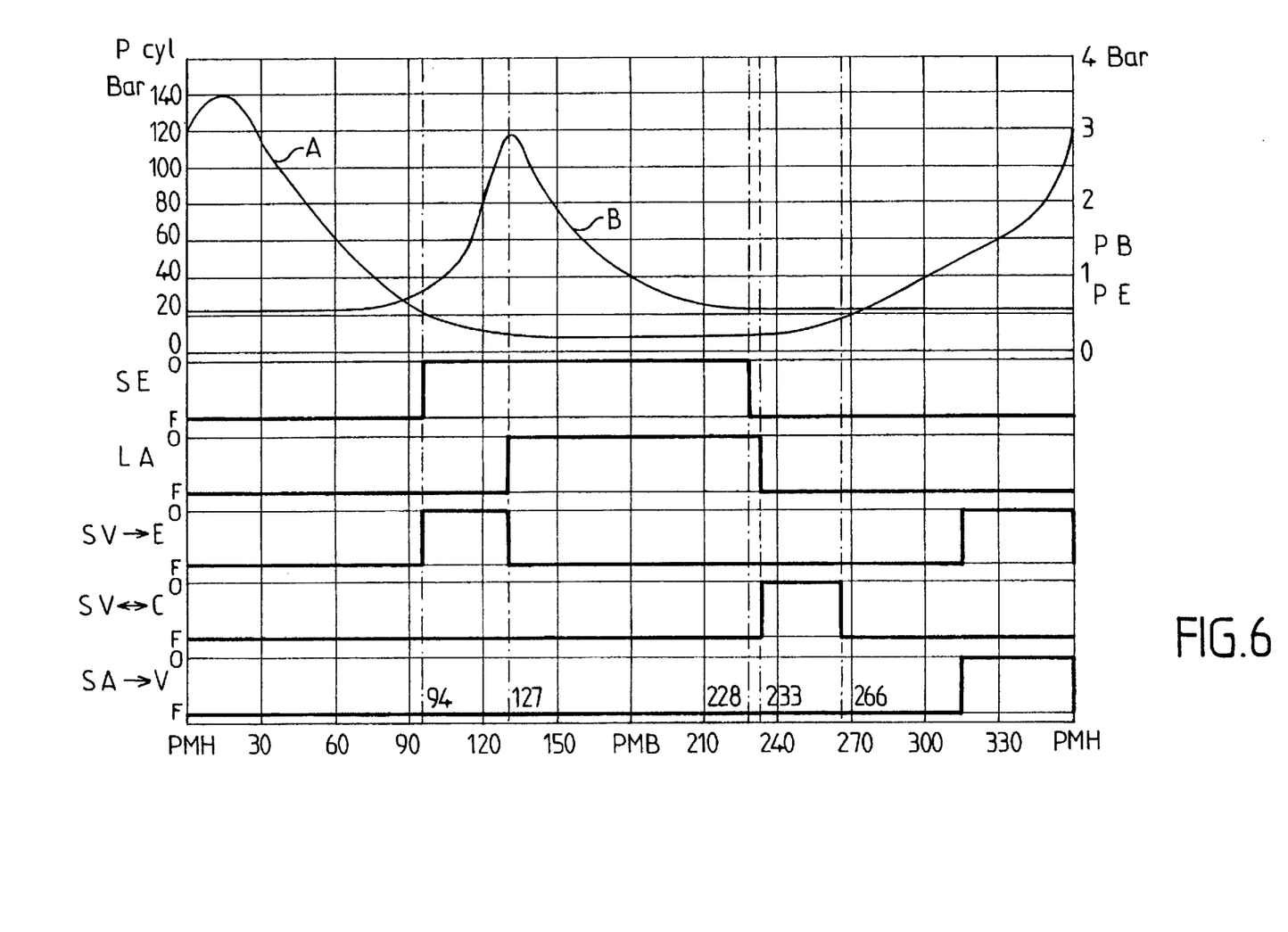
FIGS. 6 to 9: four diagrams illustrating the working of the engine in FIGS. 1 to 4.

FIG. 6 illustrates the operation of the exemplary embodiment of FIG. 1. Curve A is the cylinder pressure curve; curve B is the exhaust pressure curve; EV means exhaust valve; IP means inlet port; the symbol V⇌E denotes transfers, in one direction or the other, between the volume 10 and the exhaust; the symbol V⇌C denotes transfers between the volume 10 and the cylinder; the symbol I→V denotes transfer from the inlet to the volume 10.

It can be seen in particular that the exhaust valve is open between 94° and 288° of rotation of the crankshaft 5; that the inlet ports are uncovered by the piston 2 between 127° and 233° that between 94° and 127° and between 315° and 360° there is communication between the volume 10 and the exhaust (in FIG. 1c, it can be seen that this communication is from the exhaust to the volume 10; and in FIG. 1h it can be seen that this communication is from the volume to the exhaust) that between 233° and 266° there is communication between the volume 10 and the cylinder 1 (which corresponds to FIG. 1g); and that between 315° and 360° there is communication between the inlet (ports 7, manifold 8) and the volume 10 (via the pipe 18, through the shutter 11 and the pipe 17; which corresponds to FIG. 1g)

Figure 7:
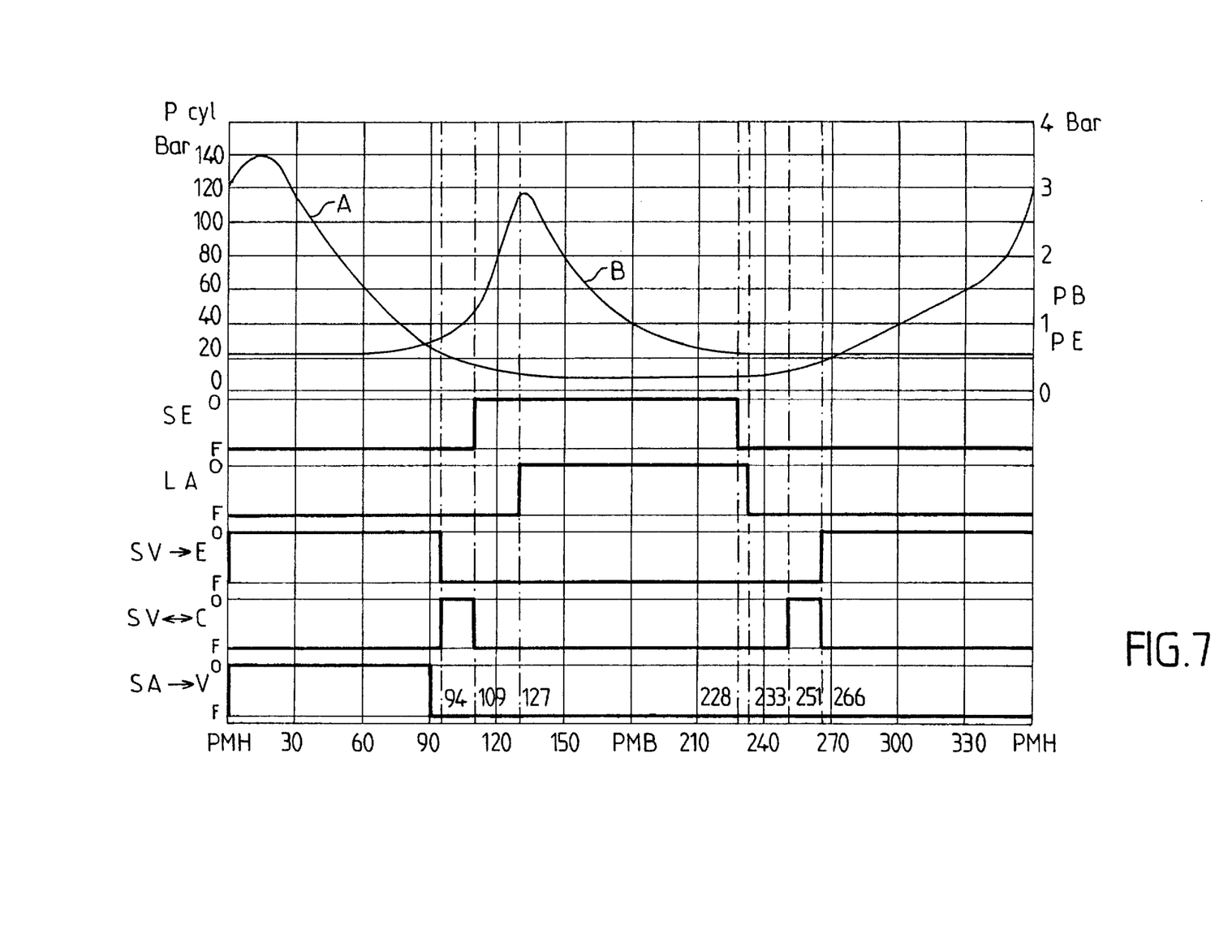
Figure 8:
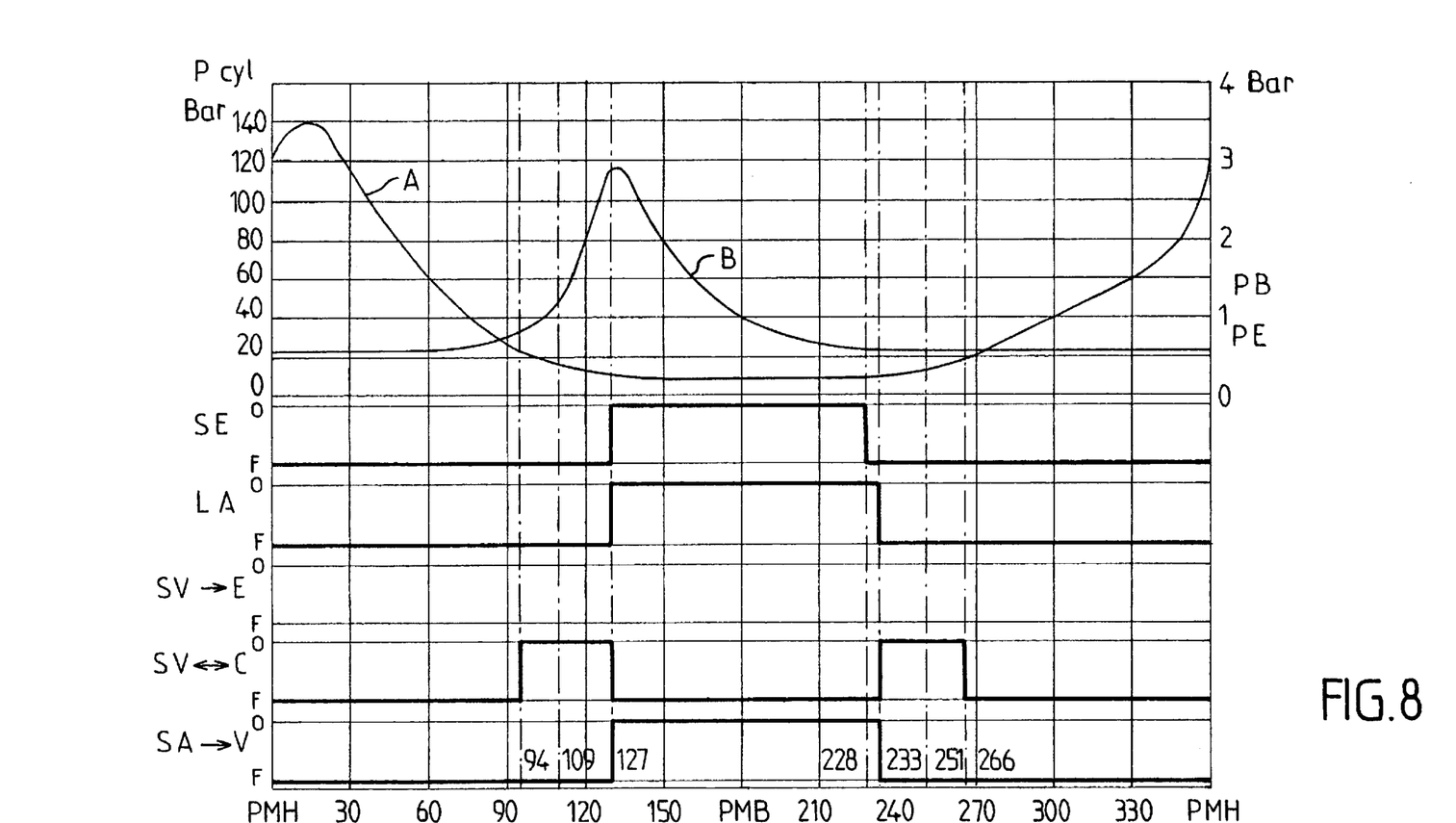
Figure 9:
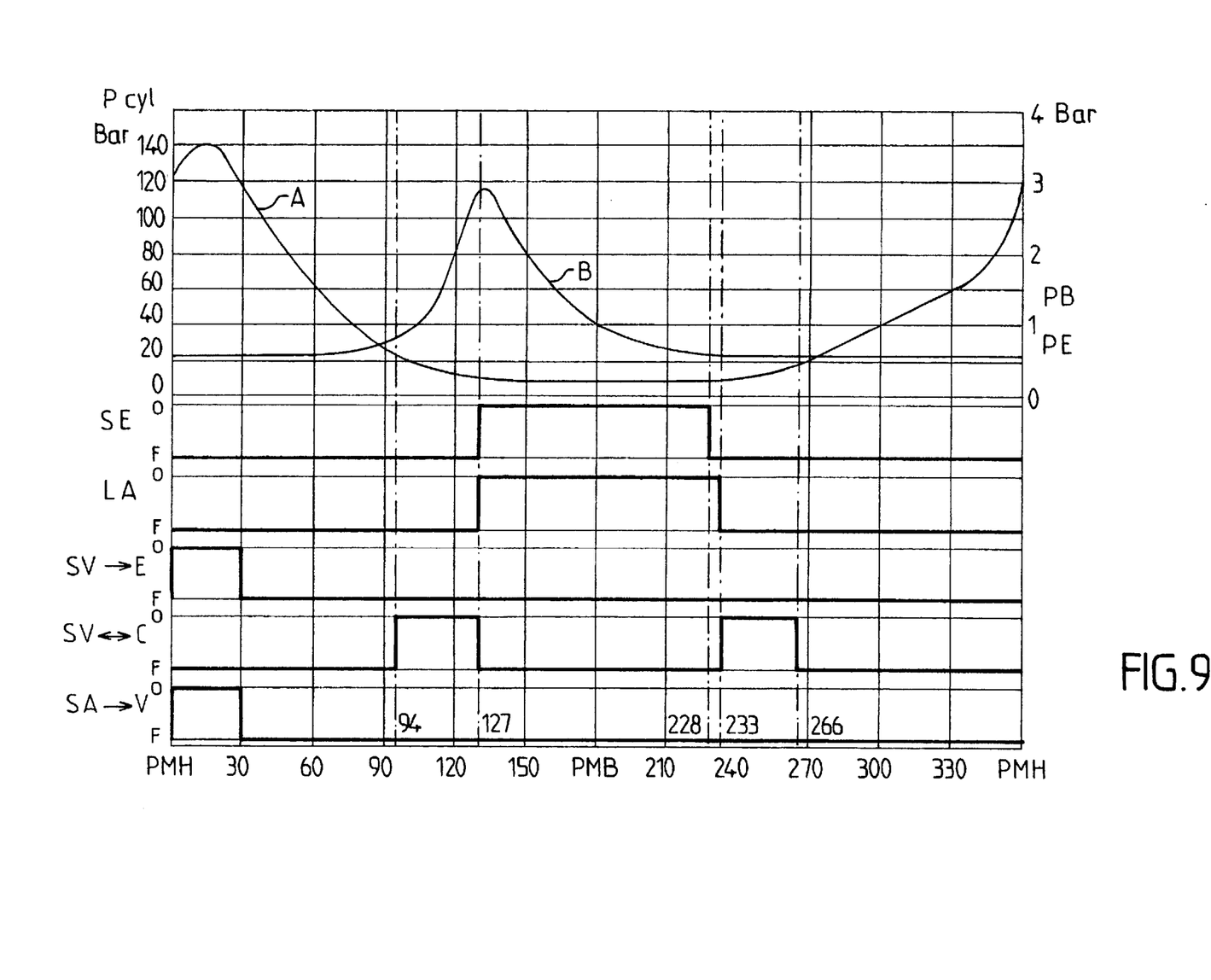

Similarly, FIG. 7 corresponds to the operation of the embodiment of FIG. 2; FIG. 8 to FIG. 3 and FIG. 9 to FIG. 4.

What is claimed is:

1. A two-stroke engine comprising:

a cylinder;

a piston movable in said cylinder;

an exhaust device and an inlet device communicating with respective outlet and inlet ports of said cylinder;

a blower connected to said cylinder for sending a stream of scavenging air into said cylinder; and a device defining an additional volume communicating with said cylinder and said blower through at least one closable opening device, said at least one closable opening device allowing the scavenging air from said blower to be delivered into said device defining the additional volume, wherein a movement of said at least one closable opening device is controllable so that said at least one closable opening device is one of synchronous with and phase-shifted with respect to a movement of the piston in the cylinder, wherein gases burnt during a combustion phase compress air located in the device defining the additional volume by at least partially entering the device defining the additional volume, and wherein a mixture of the air and the burnt gases is trapped under pressure in the device defining the additional volume in a subsequent phase of discharge of burnt gases from said cylinder, said mixture entering the cylinder during an induction phase.

2. The engine as claimed in claim 1, wherein said device defining the additional volume is refillable with fresh air from said blower, after the induction phase.

3. The engine as claimed in claim 2, wherein said at least one closable opening device are two rotary shutters, and wherein said exhaust device is at least one exhaust valve, a first pipe connecting a first one of said two rotary shutters to said at least one exhaust valve, and a second pipe connecting a second one of said two rotary shutters to an inlet ring that is connected to and supplies said inlet device.

4. The engine as claimed in claim 3, wherein the device defining the additional volume is between the first and second rotary shutters and is connected to the first and second rotary shutters by third and fourth pipes.

5. The engine as claimed in claim 4, wherein the first rotary shutter is movable from a first position so that a top of the cylinder is in flow communication with a first end of the device defining the additional volume in said combustion phase so that the burnt gases enter the first end of the device defining the additional volume under pressure to a second position to interrupt the flow communication between the top of the cylinder and the first end of the device defining the additional volume just before the piston reaches a bottom dead center position, and the second rotary shutter is movable from a first position so that the cylinder is in flow communication with the device defining the additional volume through a pipe connected near a bottom of the cylinder, so that the device defining the additional volume is emptied of the burnt gases through a second end of the device defining the additional volume to a second position to interrupt the flow communication between the cylinder and the second end of the device defining the additional volume.

6. The engine as claimed in claim 5, wherein the second rotary shutter is movable from the position to a third position so that the device defining the additional volume is fillable with air from the blower through the fourth pipe and said second rotary shutter.

7. The engine as claimed in claim 6, wherein the second rotary shutter is a four-way shutter.

8. The engine as claimed in claim 6, wherein the second rotary shutter is a two-way shutter.

9. The engine as claimed in claim 7, wherein the first and second shutters are movable so that when the piston is at top dead center position, a stream of scavenging air passes through the device defining the additional volume, when the piston is in a half-stroke position, the cylinder is in flow communication with the device defining the additional volume through the second rotary shutter and the cylinder is in flow communication with the at least one exhaust valve through the first rotary shutter, so that the device defining the additional volume is filled with the mixture of air and burnt gases under pressure, when the piston is in a position subsequent to said half-stroke position, the mixture is trapped in the device defining the additional volume, when the piston is in yet another position subsequent to said half-stroke position, scavenging air enters the cylinder, and when the piston is in a position at a start of the combustion phase, the pressurized trapped mixture in the device defining the additional volume is exhausted into the cylinder.

10. The engine as claimed in claim 8, wherein the first and second shutters are movable so that when the piston is at top dead center position, a stream of scavenging air passes through the device defining the additional volume, when the piston is in a half-stroke position, the cylinder is in flow communication with the device defining the additional volume through the second rotary shutter and the cylinder is in flow communication with the at least one exhaust valve through the first rotary shutter, so that the device defining the additional volume is filled with the mixture of air and burnt gases under pressure, when the piston is in a position subsequent to said half-stroke position, the mixture is trapped in the device defining the additional volume, when the piston is in yet another position subsequent to said half-stroke position, scavenging air enters the cylinder, and when the piston is in a position at a start of the combustion phase, the pressurized trapped mixture in the device defining the additional volume is exhausted into the cylinder.

11. The engine as claimed in claim 1, further comprising a cooling device for cooling said device defining the additional volume.

12. A two-stroke engine comprising:

a cylinder;

a piston movable in said cylinder;

an exhaust device and an inlet device communicating with respective outlet and inlet ports of said cylinder;

a blower connected to said cylinder for sending a stream of scavenging air into said cylinder; and a device defining an additional volume communicating with said cylinder and said blower through at least one closable opening device, said at least one closable opening device allowing the scavenging air from said blower to be delivered into said device defining the additional volume, wherein a movement of said at least one closable opening device is controllable so that said at least one closable opening device is one of synchronous with and phase-shifted with respect to a movement of the piston in the cylinder, wherein gases burnt during a combustion phase compress a first air and burnt gases mixture located in the device defining the additional volume by at least partially entering the device defining the additional volume, and wherein the burnt gases and the first air and burnt gases mixture form a second mixture of air and burnt gases that is trapped under pressure in the device defining the additional volume in a subsequent phase of discharge of burnt gases from said cylinder, said second mixture entering the cylinder during an induction phase.

13. The engine as claimed in claim 12, wherein the device defining the additional volume is a closed volume and the at least one closable opening device is a single rotary shutter having an internal volume for storing fresh air, the air being driven from said internal volume into said cylinder by said second mixture in the device defining the additional volume.

14. The engine as claimed in claim 13, wherein the single rotary shutter is movable so that when the piston has covered about half of an expansion stroke, the single rotary shutter moves to a first position so that said cylinder is in flow communication with said device defining the additional volume, so that air in a first duct between said cylinder and said device defining the additional volume is compressed by said burnt gases, when the single rotary shutter is in a second position, air from the blower passes through the single rotary shutter so that the blower is in flow communication with the cylinder, a portion of the air passing through the single rotary shutter remaining in the internal volume of the single rotary shutter, when the single rotary shutter is in a third position, the portion of the air is entrapped in the shutter, and when the single rotary shutter is in a fourth position, the piston is at a start of a compression stroke and the cylinder is in flow communication with the device defining the additional volume so that the second mixture is discharged into the cylinder to drive out the air in the spool of the single rotary shutter.

15. The engine as claimed in claim 12, further comprising a device for cooling said device defining the additional volume.

* * * * *